US012619317B2

(12) United States Patent
Asoka Kumar Shenoi et al.

(10) Patent No.: US 12,619,317 B2
(45) Date of Patent: May 5, 2026

(54) TECHNIQUES FOR UTILIZING A HAND ENGAGEMENT STATE FOR PROCESSING USER INPUT

(71) Applicant: Apple Inc., Cupertino, CA (US)

(72) Inventors: Ashwin Kumar Asoka Kumar Shenoi, San Jose, CA (US); Julian K. Shutzberg, San Francisco, CA (US); Leah M. Gum, Sunol, CA (US); Daniel J. Brewer, San Jose, CA (US); Chia-Ling Li, San Jose, CA (US)

(73) Assignee: Apple Inc., Cupertino, CA (US)

( * ) Notice: Subject to any disclaimer, the term of this patent is extended or adjusted under 35 U.S.C. 154(b) by 119 days.

(21) Appl. No.: 18/302,888

(22) Filed: Apr. 19, 2023

(65) Prior Publication Data

US 2023/0333665 A1     Oct. 19, 2023

Related U.S. Application Data

(60) Provisional application No. 63/363,204, filed on Apr. 19, 2022.

(51) Int. Cl.
*G06F 3/01* (2006.01)
*G06F 3/16* (2006.01)

(52) U.S. Cl.
CPC .............. *G06F 3/017* (2013.01); *G06F 3/013* (2013.01); *G06F 3/16* (2013.01)

(58) Field of Classification Search
CPC   G06F 3/017; G06F 3/013; G06F 3/16; H04N 23/611
See application file for complete search history.

(56) References Cited

U.S. PATENT DOCUMENTS

| | | | | |
|---|---|---|---|---|
| 9,230,160 | B1 * | 1/2016 | Kanter .................. | G06V 40/28 |
| 9,756,297 | B1 * | 9/2017 | Clements ............. | A61B 5/0077 |
| 9,836,212 | B2 * | 12/2017 | Jingushi ............... | H04B 1/3827 |
| 10,701,316 | B1 * | 6/2020 | Cheung .................. | H04N 7/157 |
| 11,256,336 | B2 * | 2/2022 | Schoen ................. | G06F 1/163 |
| 11,294,474 | B1 * | 4/2022 | Stewart ............... | G06V 40/113 |
| 11,556,172 | B1 * | 1/2023 | Stevens ............. | G06F 3/04842 |
| 2006/0218501 | A1 * | 9/2006 | Wilson .................. | G06F 3/0486 |
| | | | | 715/769 |
| 2008/0079902 | A1 * | 4/2008 | Mandelstam-Manor .................... | |
| | | | | A61B 3/0091 |
| | | | | 351/222 |
| 2009/0217211 | A1 * | 8/2009 | Hildreth ................. | G06F 3/048 |
| | | | | 715/863 |
| 2012/0242793 | A1 * | 9/2012 | Im .......................... | G06F 3/011 |
| | | | | 348/46 |
| 2013/0198690 | A1 * | 8/2013 | Barsoum ............... | G06F 3/0482 |
| | | | | 715/822 |

(Continued)

*Primary Examiner* — Sejoon Ahn
(74) *Attorney, Agent, or Firm* — Blank Rome LLP

(57) ABSTRACT

Techniques for managing an engagement zone include tracking, by a system, a hand of a user and determining that a height of the hand of the user satisfies a first threshold height. In accordance with determining that the height of the hand of the user satisfies the first threshold height, the techniques also include initiating a UI engagement state, wherein the system monitors the user for user input during the UI engagement state, and determining user input into the system based on a user motion detected while the hand is tracked. The threshold height is associated with a boundary of a UI engagement zone and is modifiable based on user activity.

20 Claims, 7 Drawing Sheets

(56)          References Cited

U.S. PATENT DOCUMENTS

| | | | |
|---|---|---|---|
| 2014/0028567 A1* | 1/2014 | Park | G06F 3/0236 |
| | | | 345/168 |
| 2014/0062890 A1* | 3/2014 | Leung | G06F 3/0484 |
| | | | 345/172 |
| 2014/0075377 A1* | 3/2014 | Kang | H04M 1/72409 |
| | | | 715/788 |
| 2014/0118260 A1* | 5/2014 | Chen | G06F 3/0346 |
| | | | 345/158 |
| 2014/0201683 A1* | 7/2014 | Holz | G06F 3/017 |
| | | | 715/848 |
| 2014/0267029 A1* | 9/2014 | Govil | G06F 3/0227 |
| | | | 345/157 |
| 2014/0340498 A1* | 11/2014 | Plagemann | G06V 40/28 |
| | | | 348/77 |
| 2014/0351715 A1* | 11/2014 | Huang | H04L 65/403 |
| | | | 715/753 |
| 2015/0062036 A1* | 3/2015 | Tasaki | H04N 21/42204 |
| | | | 345/173 |
| 2015/0193111 A1* | 7/2015 | Kauffmann | G06F 3/0425 |
| | | | 715/825 |
| 2015/0220150 A1* | 8/2015 | Plagemann | G06F 3/017 |
| | | | 715/856 |
| 2016/0026375 A1* | 1/2016 | Wu | G06F 3/0446 |
| | | | 715/765 |
| 2016/0034145 A1* | 2/2016 | Lee | G06F 3/0486 |
| | | | 715/765 |
| 2016/0073017 A1* | 3/2016 | Ogasawara | H04N 23/611 |
| | | | 463/31 |
| 2017/0132828 A1* | 5/2017 | Zelenin | A63F 13/63 |
| 2017/0147180 A1* | 5/2017 | Yoon | G01C 21/3638 |
| 2017/0329412 A1* | 11/2017 | Schwesig | G06F 3/03547 |
| 2018/0088775 A1* | 3/2018 | Ye | G06F 3/0346 |
| 2019/0004609 A1* | 1/2019 | Swissa | G06V 40/28 |
| 2019/0041994 A1* | 2/2019 | Cho | G06F 3/017 |
| 2019/0107887 A1* | 4/2019 | Bazor | G06V 40/28 |
| 2019/0310719 A1* | 10/2019 | Nandakumar | G06F 3/014 |
| 2020/0374386 A1* | 11/2020 | Xu | H04N 23/651 |
| 2021/0055804 A1* | 2/2021 | Chen | G06F 3/0488 |
| 2021/0056937 A1* | 2/2021 | Sakai | G06F 3/1454 |
| 2021/0117707 A1* | 4/2021 | Hwang | G06N 3/0464 |
| 2021/0183127 A1* | 6/2021 | Kwon | G06T 15/005 |
| 2021/0325960 A1* | 10/2021 | Iglesias | G06F 3/04842 |
| 2022/0057978 A1* | 2/2022 | Huang | G06F 3/16 |
| 2022/0093002 A1* | 3/2022 | Choi | A61B 5/1112 |
| 2022/0101612 A1* | 3/2022 | Palangie | G06V 40/28 |
| 2022/0121344 A1* | 4/2022 | Pastrana Vicente | |
| | | | G06F 3/04815 |
| 2022/0197392 A1* | 6/2022 | Zhou | G06F 3/017 |
| 2022/0206586 A1* | 6/2022 | Yitzhak | G02B 27/0093 |
| 2022/0253148 A1* | 8/2022 | Sorgi | G06F 3/017 |
| 2022/0317776 A1* | 10/2022 | Sundstrom | G06F 3/04845 |
| 2024/0288938 A1* | 8/2024 | Dahlgren | G06F 3/017 |
| 2025/0061997 A1* | 2/2025 | Choi | G16H 10/60 |

* cited by examiner

205
MONITOR ONE OR MORE HANDS IN A
SCENE

210
DETECT A CURRENT LOCATION OF THE
HAND

215
DETERMINE A CURRENT HEIGHT OF
THE HAND

225
CONTINUE MONITORING THE
HAND

220
HEIGHT SATISFIES
THRESHOLD?

N

Y

230
INITIATE UI ENGAGEMENT STATE

235
DISPLAY USER INTERFACE
COMPONENTS

240
MONITOR HAND FOR USER INPUT

N

Y

245
IS HAND INACTIVE?

Y

250
CEASE UI ENGAGEMENT STATE

200

TECHNIQUES FOR UTILIZING A HAND ENGAGEMENT STATE FOR PROCESSING USER INPUT

BACKGROUND

Some devices are capable of generating and presenting extended reality (XR) environments. An XR environment may include a wholly or partially simulated environment that people sense and/or interact with via an electronic system. In XR, a subset of a person's physical motions, or representations thereof, are tracked, and, in response, one or more characteristics of one or more virtual objects simulated in the XR environment are adjusted in a manner that comports with realistic properties. Some XR environments allow multiple users to interact with virtual objects or with each other within the XR environment. For example, users may use gestures to interact with components of the XR environment. However, what is needed is an improved technique to manage tracking of a hand performing the gesture.

DETAILED DESCRIPTION

Figures 1A, 1B:
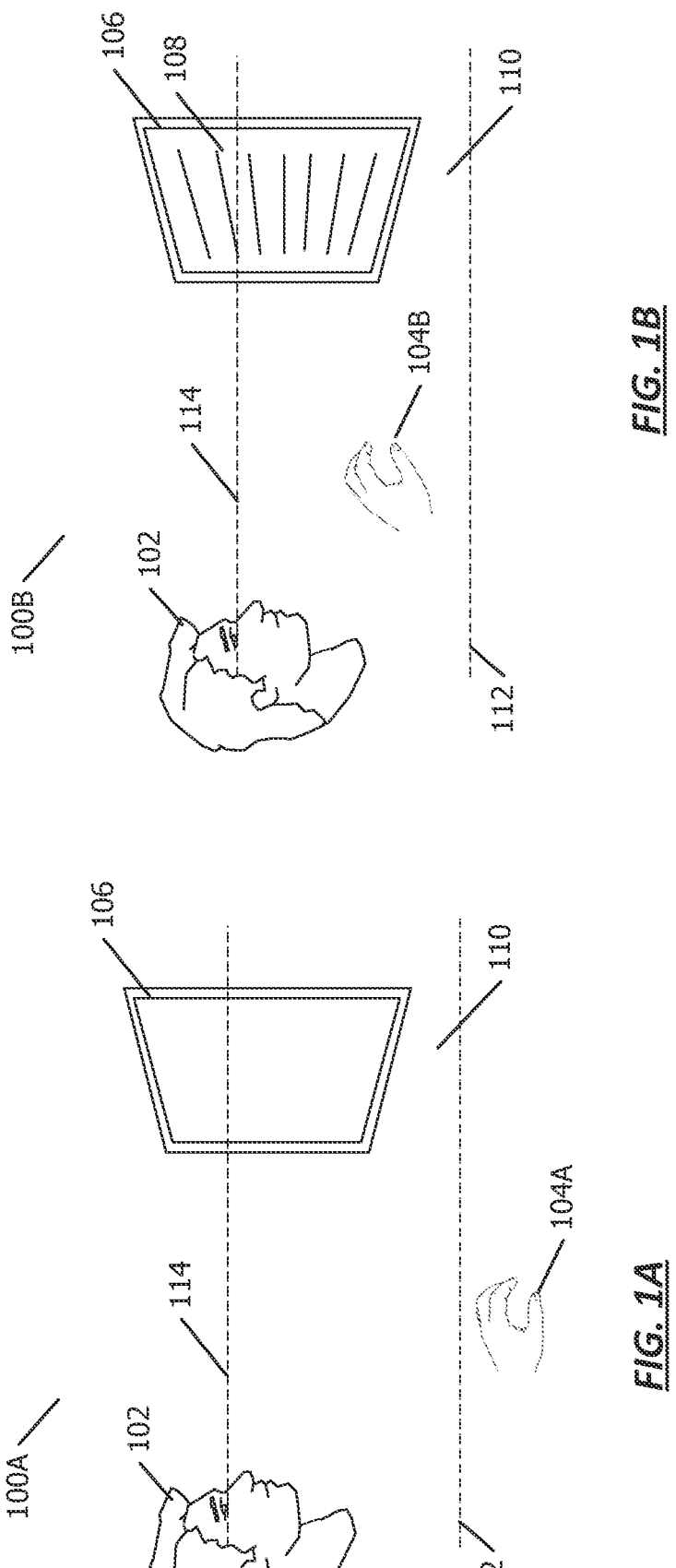
FIGS. 1A-1B show a system setup for a user interacting with a device, in accordance with some embodiments.

This disclosure pertains to systems, methods, and computer readable media to manage an engagement zone for a user's hands such that a user interface is modified in accordance with a detection that the user's hand or hands are within the engagement zone. Generally, an engagement model includes first determining how the user expresses intent to interact with a UI. In a second stage, the engagement model tracks how a user interacts with the UI. Finally, in a third stage, the engagement model tracks how a user expresses intent to disengage with a UI. According to some embodiments, a user can raise their hand to express an intent to interact with a UI. For example, the hand may enter an engagement zone in a space in which it is determined that the user intends to interact with the UI. During this engaged state, a system can track the user's motion, such has hand or eye movement, to detect interaction with the UI. The user may disengage from the engaged state by leaving the engagement zone.

According to some embodiments, the disengaged state may also be triggered based on a detected resting pose by the user's hand. That is, if the user's hand or hands are still within the boundary but rest on a surface, the user may be considered to be disengaged. Further, in some embodiments, the boundary delineating a user engagement zone may be modified based on the resting state. That is, a lower boundary of the user engagement zone may be set to some distance above the hand and/or the surface on which the hand is resting in accordance with some embodiments. As such, when the hand moves again, user input will not be tracked by the system until the user's hand or hands are within the engagement zone delineated by the updated boundary. Accordingly, by dynamically augmenting the engagement zone after a user rests, less user movement is required to interact with a system from a resting position, thereby enhancing user input techniques for interaction with an electronic system.

A physical environment refers to a physical world that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an XR environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head-mountable systems, projection-based systems, heads-up displays (HUD), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head-mountable system may have one or more speaker(s) and an integrated opaque display. Alternatively, a head-mountable system may be configured to accept an external opaque display (e.g., a smartphone). The head-mountable system may incorporate one or more imaging sensors to capture images or video of the physical environment, and/or one or more microphones to capture audio of the physical environment. Rather than an opaque display, a head-mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

In the following description, for purposes of explanation, numerous specific details are set forth in order to provide a thorough understanding of the disclosed concepts. As part of this description, some of this disclosure's drawings represent structures and devices in block diagram form in order to avoid obscuring the novel aspects of the disclosed concepts. In the interest of clarity, not all features of an actual implementation may be described. Further, as part of this description, some of this disclosure's drawings may be provided in the form of flowcharts. The boxes in any particular flowchart may be presented in a particular order. It should be understood, however, that the particular sequence of any given flowchart is used only to exemplify one embodiment. In other embodiments, any of the various elements depicted in the flowchart may be deleted, or the illustrated sequence of operations may be performed in a different order, or even concurrently. In addition, other embodiments may include additional steps not depicted as part of the flowchart. Moreover, the language used in this disclosure has been principally selected for readability and instructional purposes and may not have been selected to delineate or circumscribe the inventive subject matter, resort to the claims being necessary to determine such inventive subject matter. Reference in this disclosure to "one embodiment" or to "an embodiment" means that a particular feature, structure, or characteristic described in connection with the embodiment is included in at least one embodiment of the disclosed subject matter, and multiple references to "one embodiment" or "an embodiment" should not be understood as necessarily all referring to the same embodiment.

It will be appreciated that in the development of any actual implementation (as in any software and/or hardware development project), numerous decisions must be made to achieve a developers' specific goals (e.g., compliance with system- and business-related constraints) and that these goals may vary from one implementation to another. It will also be appreciated that such development efforts might be complex and time-consuming but would nevertheless be a routine undertaking for those of ordinary skill in the design and implementation of graphics modeling systems having the benefit of this disclosure.

FIGS. 1A-B show a system setup for a user interacting with a device, in accordance with some embodiments. It should be understood that the various features and description of FIGS. 1A-B are provided for illustrative purposes and are not necessarily intended to limit the scope of the disclosure.

In FIG. 1A, a system setup 100A is provided in which a user 102 is viewing a display device 106. The use of the device 106 may be associated with a UI engagement zone 110, which is delineated by a lower boundary 112 and an upper boundary 114. However, it should be understood that in some embodiments, the UI engagement zone may be delineated by a single boundary, such as only a lower boundary, or only an upper boundary. Further, in some embodiments, additional or alternative boundaries may be used, such as one or more vertical boundaries, diagonal boundaries, or the like. As such, the engagement zone may be a horizontal region of space, or may be further or alternately delineated based on spatial boundaries. In some embodiments, when a hand of the user 104A is below the UI engagement zone 110, as shown, then a user's movement, such as a gaze direction and/or a hand movement, may be ignored or disregarded with respect to user input. That is, according to some embodiments, when the hand 104A is below the UI engagement zone 110 as presented, then the device 106 may either not track movements of the user 102 or may ignore any particular movements by the user for user input into the system.

By contrast, as shown at FIG. 1B, a system setup 100B is provided in which the user 102 is viewing the display device 106. However, in this figure, the hand of the user 104B is located within the UI engagement zone 110. That is, the hand 104B is located above the lower boundary 112, or in some instances, between the lower boundary 112 and the upper boundary 114 or other alternative boundaries. As such, a characteristic of the UI may be modified. For example, a user input component 108 may be presented, such as a menu or other item with which the user 102 can interact. For example, the user 102 may interact by hand pose input by the user hand 104B or by gaze direction. In some embodiments, the user input component 108 may be presented in response to a particular user motion detected while the user's hand 104B is within the UI engagement zone 110. According to some embodiments, when the hand 104B is within the UI engagement zone 110 as presented, then the system, such as system 106 may initiate an engaged state and initiate tracking movements of the user 102, and/or utilize tracked movements for consideration as user input into the system.

Figure 2:
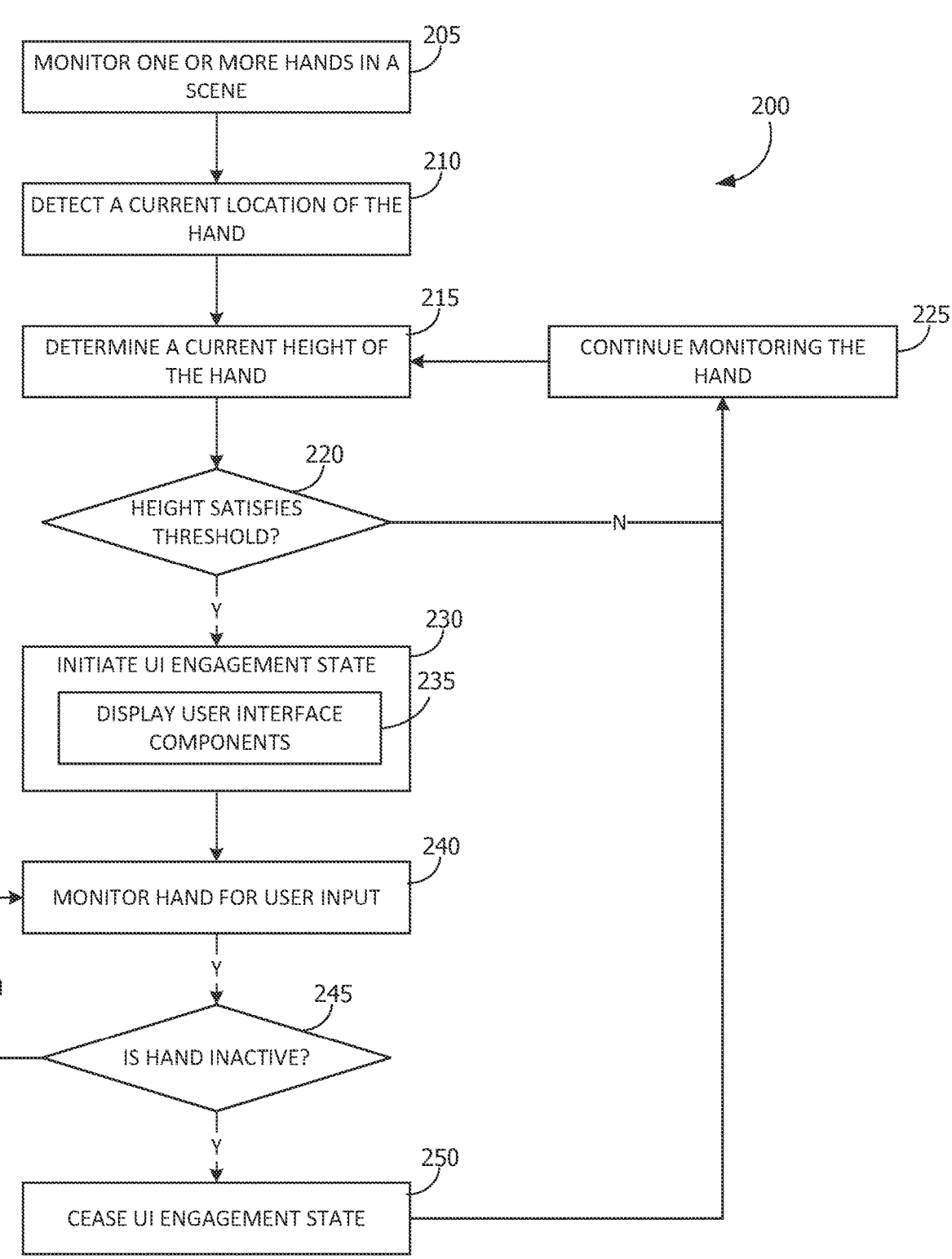
FIG. 2 shows a flowchart of a technique for initiating an engagement state, in accordance with some embodiments.

FIG. 2 shows a flowchart of a technique for initiating an engagement state, in accordance with some embodiments. For purposes of explanation, the following steps will be described as being performed by particular components. However, it should be understood that the various actions may be performed by alternate components. In addition, the various actions may be performed in a different order. Further, some actions may be performed simultaneously, and some may not be required, or others may be added.

The flowchart 200 begins at block 205 where one or more hands are monitored in a scene. The hands may be monitored by sensor data, such as image information, depth information, or other hand tracking techniques. The hands may be tracked, for example, using sensors coupled to a device being utilized by a user. Additionally, or alternatively, the hands may be tracked by an additional device having a view of the user. The flowchart 200 continues at block 210 where a current location of the hand is detected. In some embodiments, the hands may be monitored at a first level of detail, such as location only, or at a reduced granularity. That is, a current hand tracking technique may be utilized which detects a location of the hand but not a pose of the hand or the like.

At block 215, a current height of the hand is determined. In some embodiments, a height of the hand may be determined based on a height off the ground or may be determined in relation to objects or people within the environment. That is, the height of the hand may be determined in relation to the user, the system tracking the hand, a display device, a surface, or other components within the environment. In particular, the height may be determined in relation to components of the environment when the engagement zone is also defined in relation to components of the environment. For example, height of the hand may be determined using hand tracking techniques, such as with visual data, motion data on a watch connected to an arm, or the like.

The flowchart continues at bock 220 where a determination is made regarding whether the height satisfies a threshold. The threshold may be a boundary height which delineates the UI engagement zone, such as lower boundary 112 and upper boundary 114 of FIG. 1. As such, in some embodiments, the threshold may be satisfied when the hand extends above the lower threshold. Alternatively, or in addition, the threshold may be satisfied when the hand is below the upper boundary. Accordingly, if the hand is initially below the zone, the threshold may be satisfied when the height of the hand is above the lower boundary of the engagement zone, and if the hand is initially above the engagement zone, the threshold may be satisfied when the hand falls below the upper boundary of the engagement zone. If a determination is made at block 220 that the height of the hand does not satisfy the threshold, then the flowchart continues at block 225 and the system continues to monitor the hand. The flow chart 200 continues at block 215 where a current height of the hand is determined, and the process continues until at block 220 a determination is made that the height satisfies the threshold.

Returning to block 220, if a determination is made that the height of the hand satisfies the threshold, then the flowchart 200 continues to block 230 and a UI engagement state is initiated. According to one or more embodiments, in a UI engagement state, the system utilizes user motion, such as hand gestures or gaze direction, for determining user input into the UI. As such, according to some embodiments, the hand tracking and/or other user tracking (e.g., gaze tracking) may be enhanced in the UI engagement state in order to recognize user cues from user motion which should be used for user input. Further, in some embodiments, as shown at block 235, one or more user interface components may be presented in response to initiating the UI engagement state. For example, one or more prompts or menu items may be presented to the user during the UI engagement state to direct or offer options to the user to interact with the device. Alternatively, a UI may be presented in a same manner during the UI engagement state and in a disengaged state, and the tracking of the hand may be tracked to detect user motion which may be used as user input for the UI. As such, the flowchart continues at block 240 where the hand is monitored for user input. In some embodiments, other parts of the user may be monitored for user input, such as gaze, pose, and the like.

In some embodiments, the engagement state remains active while the hand is active. As such, the flowchart continues at block 245, and the hand is continued to be monitored while the hand is active. In some embodiments, the system may use hand tracking or other techniques to track the hand. In some embodiments, visual tracking may be used to determine if the hand is in a resting state, for example using a camera or other image sensor. In another example, movement or other sensor data may be used to determine if the hand is active or in a resting state, such as an IMU or other motion tracking sensor attached to the hand or arm of the user. The system may use a predetermined timeout period to determine whether the hand is in an inactive, or resting, state. For example, if a user's hand does not move for a predetermined amount of time, the user's hand may be determined to be inactive. Additionally, or alternatively, other characteristics of the hand may be tracked to determine whether the hand is in an active state, such as a pose of the hand, and/or whether the hand is resting on a surface. As such, in some embodiments, the determination of the inactive state may be based on a set of heuristics regarding the state of the hand. Further, in some embodiments, the various heuristics used for consideration may be weighted, for example, based on user preference, UI type, predetermined encoding from the system, and the like. If at block 245 the hand is determined to be inactive, the flowchart proceeds to block 250, and the UI engagement state is ceased. That is, the system initiates a disengaged state such that the user motions are not tracked for user input cues.

According to some embodiments, the determination to initiate the UI engagement state, as in block 230, and to disengage, as in block 250, may be determined based on a set of heuristics, including the hand location. That is, in some embodiments, an engagement value may be determined based on the hand location as well as other cues by the user, system, or environment. For example, heuristics used for consideration of an engagement score may include the hand location and whether the hand is active, as well as other features, such as a gaze direction (e.g., whether or not a user's gaze is focused on the UI), a UI context, a proximity to the engagement zone, an orientation of the hand, a category of hand pose (e.g., whether the hand pose is conducive for input), whether a hand is occupied, such as holding an object, or the like. The various heuristics may be weighted against each other to determine an estimated engagement score. As such, in some embodiments, the UI engagement state may be initiated at 230 when the engagement score satisfies a threshold. Said another way, whether the hand height satisfies a threshold, as described at block 220, may be one of a set of heuristics considered to determine whether to initiate the UI engagement state. Similarly, at block 245, whether to cease the UI engagement state may be determined based on the engagement score and whether the engagement score fails to satisfy the threshold.

Figures 3A, 3B:
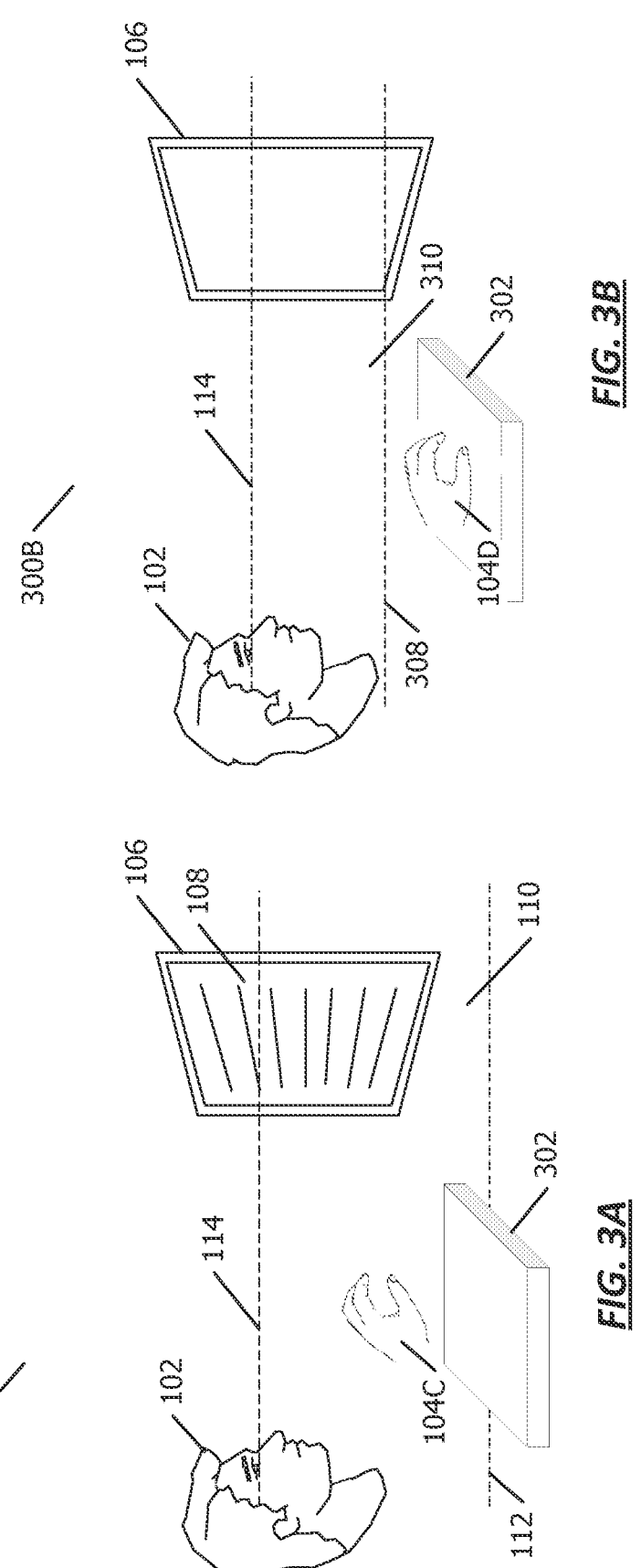
FIGS. 3A-3B show a system setup for modifying an engagement zone, in accordance with some embodiments.

According to some embodiments, the UI engagement zone may be dynamically modified based on user behavior. For example, if a user's hand enters a resting state, the system may enter a disengaged state, and the engagement zone may be reset or modified. FIGS. 3A-B show a system setup for modifying an engagement zone, in accordance with some embodiments.

In FIG. 3A, a system setup 300A is provided in which the user 102 is viewing a display device 106. The use of the device 106 may be associated with a UI engagement zone 110, which is delineated by a lower boundary 112 and, optionally, an upper boundary 114. In this example, the hand of the user 104C is located within the UI engagement zone 110 and is hovering over a surface 302 in the environment. That is, the hand 104C is located between the lower boundary 112 and the upper boundary 114. As such, a characteristic of the UI may be modified. The device 106 may initiate an engaged state and initiate tracking movements of the user 102, and/or utilize tracked movements for consideration as user input into the system. As shown, a UI component 108 may be presented.

By contrast, as shown at FIG. 3B, a system setup 300B is provided in which the user 102 is viewing the display device 106. However, in this figure, the hand of the user 104D is in a resting position on surface 302, and the engagement zone 310 has been modified from the prior engagement zone 110 of FIG. 3A. According to some embodiments, detecting that the user's hand 104D is in a resting position may trigger a disengaged state for the UI of device 106 and/or may cause the engagement zone 310 to be modified. Thus, a system tracking the user may cease tracking user movements for the purpose of determining user input. That is, a motion by the user will not be considered for user input in the disengaged state. However, the system may continue to monitor the user for motions that would trigger the engaged state, such as using hand tracking to determine if the hand enters the UI engagement zone 310. Further, in some embodiments, a characteristic of the UI may be modified in accordance with the disengagement. For example, a user input component 108 may be removed from the display.

According to some embodiments, the engagement zone 310 may be modified based on a location of the hand 104D during the resting state. Additionally, or alternatively, the engagement zone 310 may be modified based on a location of a surface 302 on which the hand 104D is resting. In some embodiments, one or more of the boundaries of the engagement zone 310 may be modified in accordance with the location of the resting state of the hand 104D. For example, the lower boundary 308 may be set above the location of the resting hand 104D. Because the surface 302 is located within the initial engagement zone 110, the lower boundary 308 may be modified to a higher level than the original lower boundary 112 of FIG. 3A. In some embodiments, the new lower boundary 308 that delineates the engagement zone 310 may be a predetermined height from the surface 302 and/or the resting hand 104D. Further, in some embodiments, the height of the new lower boundary 308 may be dependent on other factors. For example, other components of the engagement score may be used to consider a height at which to set a lower boundary 308 of the engagement zone. As an example, a sensitivity of the UI may require a lower or higher threshold height to give a hand more room to move before initiating the engaged state. As another example, a pose of a hand may cause a difference in the height of the lower boundary 308 of the engagement zone 310, such as a hand facing toward a user requiring a higher boundary than a hand facing down. Although not shown, in some embodiments, the threshold height of the upper boundary 114 may also be modified. For example, the threshold height of the upper boundary 114 may be modified to maintain a same distance between the two boundaries delineating the engagement zone 310. However, in some embodiments, only a single threshold height may be used to delineate the engagement zone 310.

Although not shown, in some embodiments, the new lower boundary may be lower than an initial lower boundary. For example, referring to FIG. 3 if the surface 302 had been located below the UI engagement zone 310, the hand may rest below the engagement zone when resting on the surface. In this example, the original lower boundary 112 may be lowered to a height closer to the resting hand on the surface. As such, less user movement is required from a user to enter the UI engagement zone from a resting state.

Figure 4:
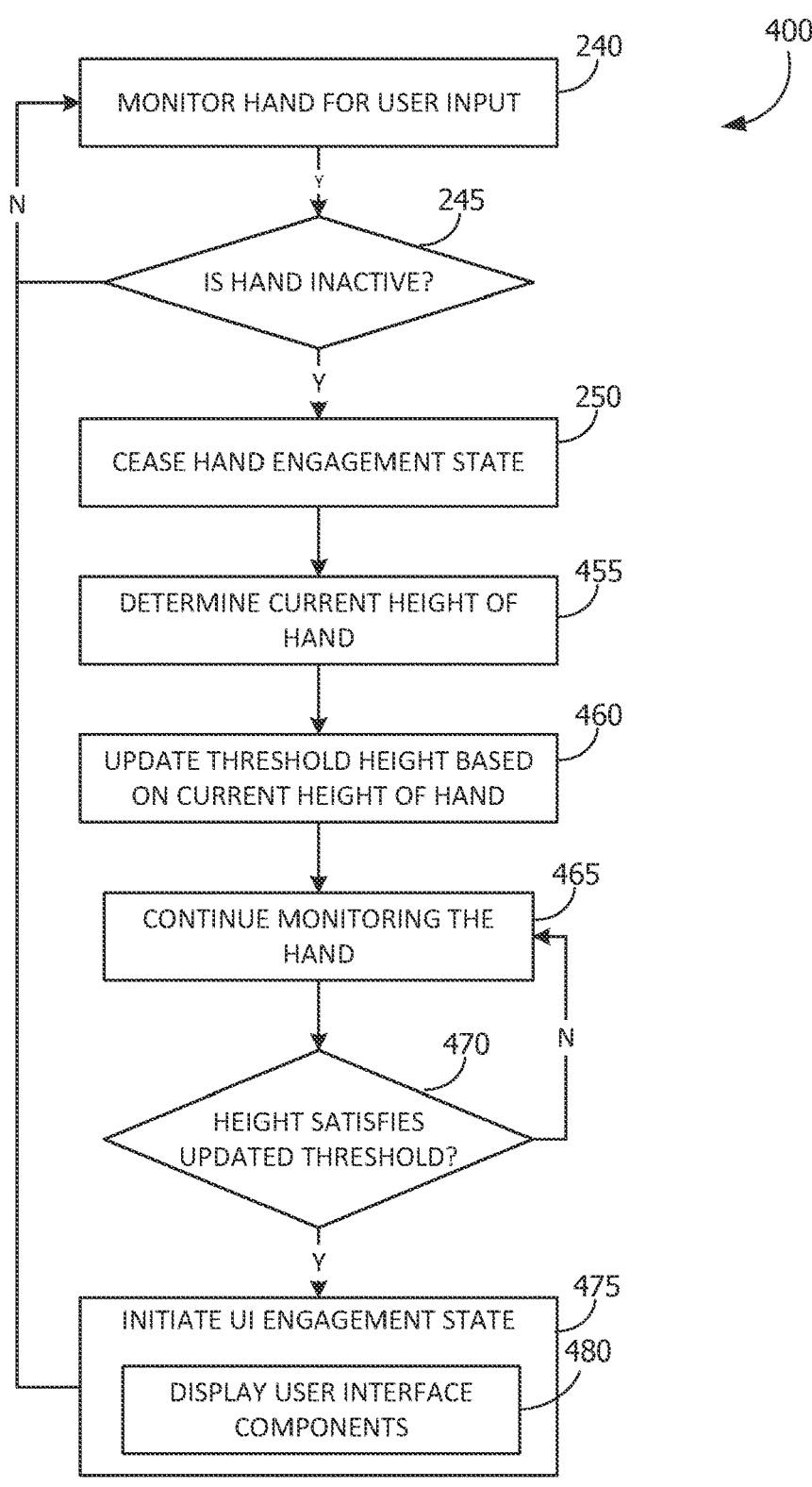
FIG. 4 shows a flowchart of a technique for dynamically managing an engagement zone, in accordance with some embodiments.

FIG. 4 shows a flowchart of a technique for dynamically managing an engagement zone, in accordance with some embodiments. For purposes of explanation, the following steps will be described in the context of FIG. 3. However, it should be understood that the various actions may be performed by alternate components. In addition, the various actions may be performed in a different order. Further, some actions may be performed simultaneously, and some may not be required, or others may be added.

The flowchart 400 begins with blocks 240, 245, and 250 from FIG. 2. In particular, at block 240, the hand or other feature of the user is monitored for user input cues. At block

245, a determination is made as to whether the hand of the user is in an active state. The flowchart returns to block 240, and the hand is monitored until the hand is determined to be in an inactive state. If at block 245 the hand is determined to be inactive, the flowchart proceeds to block 250, and the UI engagement state is ceased. That is, the system initiates a disengaged state such that the user motions are not tracked for user input cues.

The flowchart 400 continues at block 455, and the current height of the hand is determined. As described above, the height of the hand may be based on a distance from a ground surface or may be determined based on a relative distance to one or more components in the environment, such as the tracking device, the display device, the face of the user, or the like. Further, in one or more embodiments, the distance may be based on a location of the hand and/or a location of a surface on which the hand is resting. Then at block 460, the threshold height is updated based on the current height of the hand. In some embodiments, the updated threshold height may be based on a predetermined height above a current height of the hand and/or surface on which the hand is resting. Further, in some embodiments, the threshold height may be based on a relative height to a component in the environment, such as a face of the user, a display device, a tracking device, or the like.

The flowchart continues at block 465, and the system continues monitoring the hand. In some embodiments, because the hand is in a disengaged state, the hand may be monitored for less specific information than if the hand were in an engaged state. For example, a location of the hand may be monitored, but a pose of the hand may not be monitored. As another example, a lower-cost version of a hand tracking technique may be utilized than if the hand was in an engaged state, such as a lower frame rate or the like. That is, the hand may be tracked in a first manner in an engaged state and in a second manner in a disengaged state.

At block 470, a determination is made as to whether the height of the hand satisfies a threshold. That is, as the hand moves again from the resting state, the tracking system determines if the hand passes through a boundary delineating the engagement zone based on the updated threshold height from block 460. At block 470, a determination is made as to whether the height of the hand satisfies the updated threshold. If the height of the hand does not satisfy the updated threshold, then the flowchart returns to block 465, and the tracking system continues monitoring the hand. If at block 470 a determination is made that the height of the hand satisfies the updated threshold, then the flowchart concludes at block 475, and the UI engagement state is again initiated. As shown at block 480, in some embodiments, the system may display user interface components when the engaged state is activated, such as a menu, a user prompt, or the like.

Figure 5:
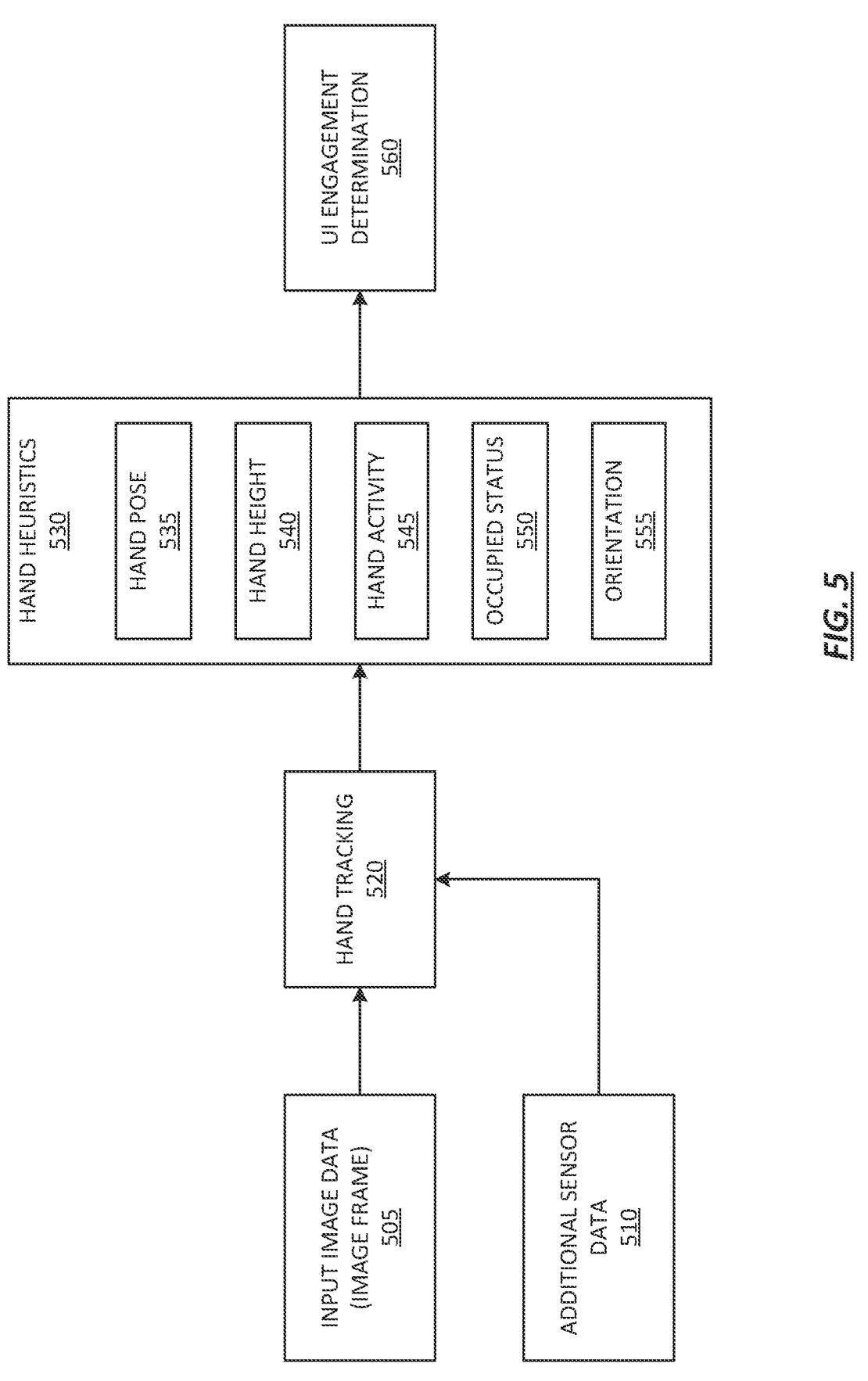
FIG. 5 shows a flow diagram of a technique for determining user interface (UI) engagement, in accordance with some embodiments.

FIG. 5 shows a flow diagram of a technique for determining UI engagement, in accordance with some embodiments. In particular, FIG. 5 depicts a data flow for considerations in determining whether to trigger an engaged state, that is, whether the user is intended to interact with a user interface. The flow diagram begins at block 505 and 510, where sensor data is collected. The sensor data may include an image frame, such as at block 505, as well as additional sensor data, as shown at block 510. In some embodiments, the sensor data may or may not include 3D information such as depth information for the scene, for example in the form of an RGBD image at block 505 and/or in the form of other depth sensor data at block 510. The sensor data may be used as input into the trained hand tracking network 520, which may be trained to predict hand location, pose, and other information from the sensor data. In some embodiments, the hand tracking neural network may also use additional data for a user, such as enrollment data collected from an enrollment process.

According to one or more embodiments, the trained hand tracking network 520 may be used to determine various heuristics 530 directly or indirectly, including, some or all of hand pose 535, hand height 540, hand activity 545, occupied status 550, orientation 555, and the like. Those heuristics may be used for a final UI engagement determination 560, indicating a likelihood that the user is intending to interact with the UI. For example, hand pose may 535 may be used to indicate whether a user is resting and/or performing an intentional interaction. Hand height 540 may be used to determine if the hand is within the engagement zone. Hand activity 545 may be used to determine whether the hand is active or inactive. Occupied status 550 may indicate whether a user's hand is occupied. For example, if a user is holding an object, a user may be less likely to be intended to interact with a UI according to some embodiments. Orientation 555 may indicate how likely a particular hand orientation represents an intentional interaction. In some embodiments, the UI engagement determination may provide an engagement score which could be compared against a predetermined engagement threshold score to determine whether the initiate an engaged state or not.

Figure 6:
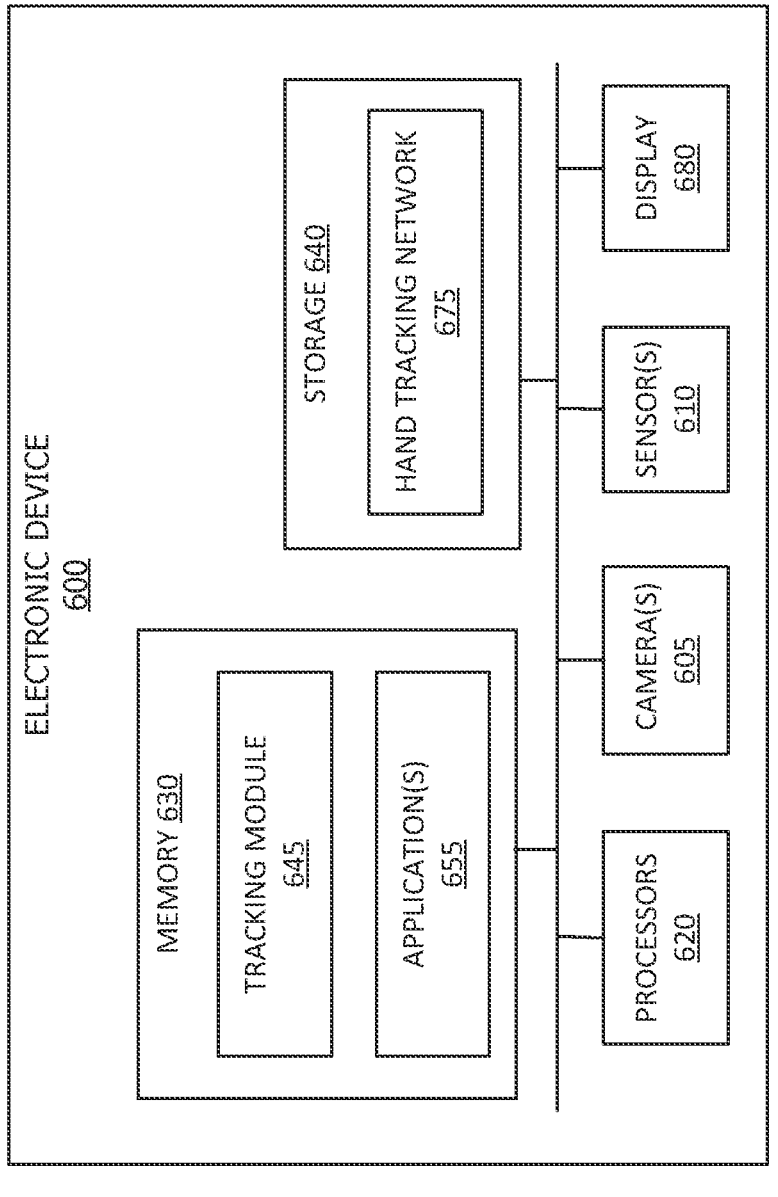
FIG. 6 shows, in block diagram form, exemplary systems for managing UI engagement, according to some embodiments.

Referring to FIG. 6, a simplified block diagram of an electronic device 600 is depicted. Electronic device 600 may be part of a multifunctional device, such as a mobile phone, tablet computer, personal digital assistant, portable music/video player, wearable device, head-mounted systems, projection-based systems, base station, laptop computer, desktop computer, network device, or any other electronic systems such as those described herein. Electronic device 600 may include one or more additional devices within which the various functionality may be contained or across which the various functionality may be distributed, such as server devices, base stations, accessory devices, and the like. Illustrative networks include, but are not limited to, a local network such as a universal serial bus (USB) network, an organization's local area network, and a wide area network such as the Internet. According to one or more embodiments, electronic device 600 is utilized to interact with a user interface of an application 655. It should be understood that the various components and functionality within electronic device 600 may be differently distributed across the modules or components, or even across additional devices.

Electronic Device 600 may include one or more processors 620, such as a central processing unit (CPU) or graphics processing unit (GPU). Electronic device 600 may also include a memory 630. Memory 630 may include one or more different types of memory, which may be used for performing device functions in conjunction with processor(s) 620. For example, memory 630 may include cache, ROM, RAM, or any kind of transitory or non-transitory computer-readable storage medium capable of storing computer-readable code. Memory 630 may store various programming modules for execution by processor(s) 620, including tracking module 645, and other various applications 655. Electronic device 600 may also include storage 640. Storage 640 may include one more non-transitory computer-readable mediums including, for example, magnetic disks (fixed, floppy, and removable) and tape, optical media such as CD-ROMs and digital video disks (DVDs), and semiconductor memory devices such as Electrically Programmable Read-Only Memory (EPROM) and Electrically Erasable Programmable Read-Only Memory (EEPROM). Storage 630 may be utilized to store various data and structures which may be utilized for storing data related to hand tracking and UI preferences. Storage 640 may be configured to store hand tracking network 675 according to one or more embodiments. Electronic device may additionally include a network interface from which the electronic device 600 can communicate across a network.

Electronic device 600 may also include one or more cameras 605 or other sensors 610, such as a depth sensor, from which depth of a scene may be determined. In one or more embodiments, each of the one or more cameras 605 may be a traditional RGB camera or a depth camera. Further, cameras 605 may include a stereo camera or other multi-camera system. In addition, electronic device 600 may include other sensors which may collect sensor data for tracking user movements, such as a depth camera, infrared sensors, or orientation sensors, such as one or more gyroscopes, accelerometers, and the like.

According to one or more embodiments, memory 630 may include one or more modules that comprise computer-readable code executable by the processor(s) 620 to perform functions. Memory 630 may include, for example, tracking module 645, and one or more application(s) 655. Tracking module 645 may be used to track locations of hands and other user motion in a physical environment. Tracking module 645 may use sensor data, such as data from cameras 605 and/or sensors 610. In some embodiments, tracking module 645 may track user movements to determine whether to trigger an engaged state and/or whether to disengage from an engaged state. Electronic device 600 may also include a display 680 which may present a UI for interaction by a user. The UI may be associated with one or more of the application(s) 655, for example. Display 680 may be an opaque display or may be semitransparent or transparent. Display 680 may incorporate LEDs, OLEDs, a digital light projector, liquid crystal on silicon, or the like.

Although electronic device 600 is depicted as comprising the numerous components described above, in one or more embodiments, the various components may be distributed across multiple devices. Accordingly, although certain calls and transmissions are described herein with respect to the particular systems as depicted, in one or more embodiments, the various calls and transmissions may be made differently directed based on the differently distributed functionality. Further, additional components may be used, some combination of the functionality of any of the components may be combined.

Figure 7:
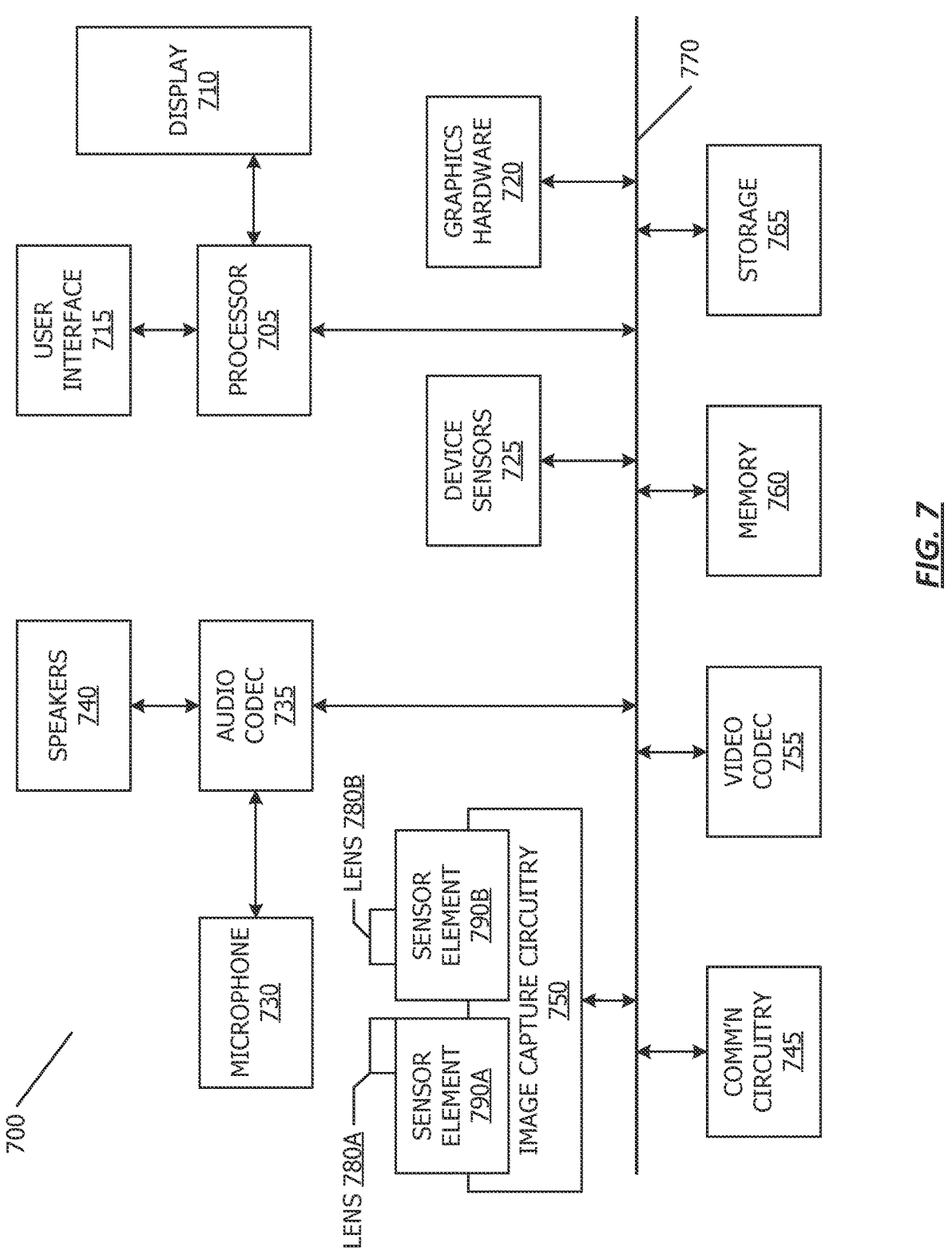
FIG. 7 shows an exemplary system for use in various extended reality technologies.

Referring now to FIG. 7, a simplified functional block diagram of illustrative multifunction electronic device 700 is shown according to one embodiment. Each of electronic devices may be a multifunctional electronic device, or may have some or all of the described components of a multifunctional electronic device described herein. Multifunction electronic device 700 may include processor 705, display 710, user interface 715, graphics hardware 720, device sensors 725 (e.g., proximity sensor/ambient light sensor, accelerometer and/or gyroscope), microphone 730, audio codec(s) 735, speaker(s) 740, communications circuitry 745, digital image capture circuitry 750 (e.g., including camera system), video codec(s) 755 (e.g., in support of digital image capture unit), memory 760, storage device 765, and communications bus 770. Multifunction electronic device 700 may be, for example, a digital camera or a personal electronic device such as a personal digital assistant (PDA), personal music player, mobile telephone, or a tablet computer.

Processor 705 may execute instructions necessary to carry out or control the operation of many functions performed by device 700 (e.g., such as the generation and/or processing of images as disclosed herein). Processor 705 may, for instance, drive display 710 and receive user input from user interface 715. User interface 715 may allow a user to interact with device 700. For example, user interface 715 can take a variety of forms, such as a button, keypad, dial, a click wheel, keyboard, display screen, touch screen, gaze, and/or gestures. Processor 705 may also, for example, be a system-on-chip such as those found in mobile devices and include a dedicated GPU. Processor 705 may be based on reduced instruction-set computer (RISC) or complex instruction-set computer (CISC) architectures or any other suitable architecture and may include one or more processing cores. Graphics hardware 720 may be special purpose computational hardware for processing graphics and/or assisting processor 705 to process graphics information. In one embodiment, graphics hardware 720 may include a programmable GPU.

Image capture circuitry 750 may include two (or more) lens assemblies 780A and 780B, where each lens assembly may have a separate focal length. For example, lens assembly 780A may have a short focal length relative to the focal length of lens assembly 780B. Each lens assembly may have a separate associated sensor element 790. Alternatively, two or more lens assemblies may share a common sensor element. Image capture circuitry 750 may capture still and/or video images. Output from image capture circuitry 750 may be processed, at least in part, by video codec(s) 755 and/or processor 705 and/or graphics hardware 720, and/or a dedicated image processing unit or pipeline incorporated within circuitry 765. Images so captured may be stored in memory 760 and/or storage 765.

Sensor and camera circuitry 750 may capture still and video images that may be processed in accordance with this disclosure, at least in part, by video codec(s) 755 and/or processor 705 and/or graphics hardware 720, and/or a dedicated image processing unit incorporated within circuitry 750. Images so captured may be stored in memory 760 and/or storage 765. Memory 760 may include one or more different types of media used by processor 705 and graphics hardware 720 to perform device functions. For example, memory 760 may include memory cache, read-only memory (ROM), and/or random access memory (RAM). Storage 765 may store media (e.g., audio, image and video files), computer program instructions or software, preference information, device profile information, and any other suitable data. Storage 765 may include one more non-transitory computer-readable storage mediums including, for example, magnetic disks (fixed, floppy, and removable) and tape, optical media such as CD-ROMs and DVDs, and semiconductor memory devices such as EPROM and EEPROM. Memory 760 and storage 765 may be used to tangibly retain computer program instructions or code organized into one or more modules and written in any desired computer programming language. When executed by, for example, processor 705 such computer program code may implement one or more of the methods described herein.

Various processes defined herein consider the option of obtaining and utilizing a user's identifying information. For example, such personal information may be utilized in order to track motion by the user. However, to the extent such personal information is collected, such information should be obtained with the user's informed consent, and the user should have knowledge of and control over the use of their personal information.

Personal information will be utilized by appropriate parties only for legitimate and reasonable purposes. Those parties utilizing such information will adhere to privacy policies and practices that are at least in accordance with appropriate laws and regulations. In addition, such policies are to be well established and in compliance with or above governmental/industry standards. Moreover, these parties will not distribute, sell, or otherwise share such information outside of any reasonable and legitimate purposes.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health-related applications, data de-identification can be used to protect a user's privacy. De-identification may be facilitated, when appropriate, by removing specific identifiers (e.g., date of birth), controlling the amount or specificity of data stored (e.g., collecting location data at city level rather than at an address level), controlling how data is stored (e.g., aggregating data across users), and/or other methods.

It is to be understood that the above description is intended to be illustrative and not restrictive. The material has been presented to enable any person skilled in the art to make and use the disclosed subject matter as claimed and is provided in the context of particular embodiments, variations of which will be readily apparent to those skilled in the art (e.g., some of the disclosed embodiments may be used in combination with each other). Accordingly, the specific arrangement of steps or actions shown in FIGS. 2 and 4-5 or the arrangement of elements shown in FIGS. 1, 3, and 6-7 should not be construed as limiting the scope of the disclosed subject matter. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A method comprising:

tracking, by an image sensor of a system, a hand of a user in image data captured by the image sensor, determining that a height of the hand of the user satisfies a first threshold height; and in accordance with determining that the height of the hand of the user satisfies the first threshold height:

initiating a UI engagement state, wherein the system monitors the hand in additional image data for user input during the UI engagement state, and determining user input into the system based on a user motion detected while the hand is monitored for user input.

2. The method of claim 1, further comprising:

determining, based on the tracking, that the hand is inactive; and in accordance with a determination that the hand is inactive, ceasing the UI engagement state.

3. The method of claim 2, further comprising, in accordance with the determination that the hand is inactive, updating the first threshold height in accordance with a current height of the hand.

4. The method of claim 3, further comprising:

in accordance with determining that the hand satisfies the updated first threshold height, re-initiating the UI engagement state.

5. The method of claim 1, wherein the height of the hand is a first heuristics of a plurality of heuristics, and wherein the UI engagement state is initiated in accordance with a combination of the plurality of heuristics.

6. The method of claim 5, further comprising:

monitoring a pose of the hand for one or more predetermined poses, wherein the pose of the hand is a second heuristic of the plurality of heuristics.

7. The method of claim 6, wherein the UI engagement state is initiated in accordance with a determination that the pose of the hand corresponds a valid hand pose.

8. A non-transitory computer-readable medium comprising computer-readable code executable by one or more processors to:

track, by an image sensor of a system, a hand of a user in image data captured by the image sensor;

determine that a height of the hand of the user satisfies a first threshold height; and in accordance with determining that the height of the hand of the user satisfies the first threshold height:

initiate a UI engagement state, wherein the system monitors the hand in additional image data for user input during the UI engagement state, and determine user input into the system based on a user motion detected while the hand is monitored for user input.

9. The non-transitory computer-readable medium of claim 8, further comprising computer-readable code to:

determine that an updated height of the hand fails to satisfy the first threshold height; and in accordance with determining that the updated height of the hand of the user fails to satisfy the first threshold height, cease the UI engagement state.

10. The non-transitory computer-readable medium of claim 8, further comprising computer-readable code to:

determine that an updated height of the hand satisfies a second threshold height greater than the first threshold height; and in accordance with determining that the updated height of the hand satisfies a second threshold height greater than the first threshold height, cease the UI engagement state.

11. The non-transitory computer-readable medium of claim 8, wherein the height of the hand is a first heuristics of a plurality of heuristics, and wherein the UI engagement state is initiated in accordance with a combination of the plurality of heuristics.

12. The non-transitory computer-readable medium of claim 11, further comprising computer readable code to:

monitor a pose of the hand for one or more predetermined poses, wherein the pose of the hand is a second heuristic of the plurality of heuristics.

13. The non-transitory computer-readable medium of claim 12, wherein the UI engagement state is initiated in accordance with a determination that the pose of the hand corresponds a valid hand pose.

14. The non-transitory computer-readable medium of claim 8, further comprising computer-readable code to:

in accordance with initiating the UI engagement state, display, by the system, one or more user input components.

15. The non-transitory computer-readable medium of claim 8, wherein the user motion comprises one selected from a group consisting of a hand gesture and a gaze.

16. A system comprising:

an image sensor;

one or more processors;

one or more computer-readable media comprising computer-readable code executable by the one or more processors to:

track, by the image sensor, a hand of a user in image data captured by the image sensor;

determine that a height of the hand of the user satisfies a first threshold height; and in accordance with determining that the height of the hand of the user satisfies the first threshold height:

initiate a UI engagement state, wherein the system monitors the hand in additional image data for user input during the UI engagement state, and determine user input into the system based on a user motion detected while the hand is monitored for user input.

17. The system of claim 16, further comprising computer-readable code to:

determine that an updated height of the hand fails to satisfy the first threshold height; and in accordance with determining that the updated height of the hand of the user fails to satisfy the first threshold height, cease the UI engagement state.

18. The system of claim 16, further comprising computer-readable code to:

determine that an updated height of the hand satisfies a second threshold height greater than the first threshold height; and in accordance with determining that the updated height of the hand satisfies a second threshold height greater than the first threshold height, cease the UI engagement state.

19. The system of claim 16, wherein the height of the hand is a first heuristics of a plurality of heuristics, and wherein the UI engagement state is initiated in accordance with a combination of the plurality of heuristics.

20. The system of claim 19, further comprising computer readable code to:

monitor a pose of the hand for one or more predetermined poses, wherein the pose of the hand is a second heuristic of the plurality of heuristics, wherein the UI engagement state is initiated in accordance with a determination that the pose of the hand corresponds a valid hand pose.

* * * * *